May 27, 1969
L. D. BULLOUGH
3,446,019
FLUID POWER DRIVE APPARATUS
Filed March 27, 1967
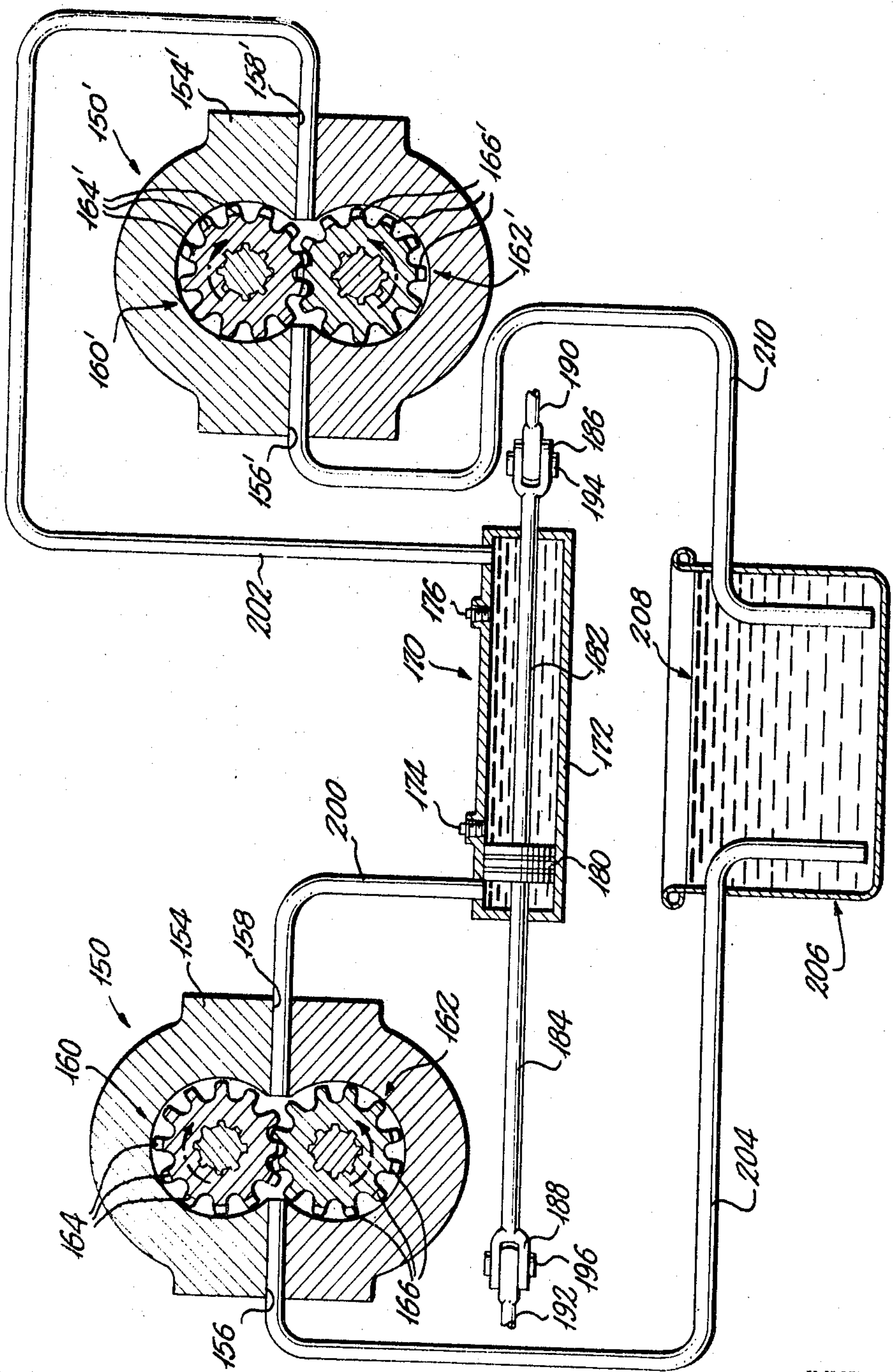
INVENTOR
*Leon D. Bullough*
BY *Shoemaker and Mattare*
ATTORNEYS United States Patent Office 3,446,019
Patented May 27, 1969

1

3,446,019
FLUID POWER DRIVE APPARATUS
Leon D. Bullough, Rte. 2, Box 109, Grafton, W. Va. 26354
Continuation-in-part of application Ser. No. 608,385, Jan. 10, 1967. This application Mar. 27, 1967, Ser. No. 632,877
Int. Cl. F15b *7/10, 15/18;* F04c *1/04*
U.S. Cl. 60—52 6 Claims

ABSTRACT OF THE DISCLOSURE

A pair of gear pumps are provided which are connected in series with one another and in series with the reciprocating driven means. The gear pumps are connected in series with one another through a reservoir means which may also function as a cooling means.

The present application is a continuation-in-part of copending U.S. patent application Ser. No. 608,385, filed Jan. 10, 1967, now abandoned.

*Background of the invention*

The present invention relates to fluid power drive apparatus for transmitting power from a continuously operating drive means or power source to a remotely positioned continuously operated driven means. The apparatus of the present invention is particularly directed to applications wherein it is desired to translate continuous rotation of the drive means into continuous reciprocation of the driven means.

The apparatus of the present invention may be employed in many applications, and is particularly adapted for use in rotary percussion or percussion drilling. The apparatus may be used for rock and/or mineral drilling, breaking, ripping, defacing and extracting operations. The reciprocating driven means of the present invention may also be used in connection with a jack hammer, a rivet gun, mechanical saws, and various agricultural implements such as mowing machines, bailers, choppers and the like. In short, the invention may be employed in any application wherein it is desired to transmit power from a continuously rotating drive means to a continuously reciprocating driven means.

Prior art apparatus for transmitting power from a continuously rotating power source to a continuously reciprocating driven means has employed mechanical drive connections of different types as well as a fluid system employing suitable valving mechanism therein. These prior art systems have presented a number of problems. They are difficult to operate at high speeds and often result in excessive wear to the drive transmitting elements. Such prior art arrangements are such that it is difficult to transmit power to driven means which is spaced a substantial distance from the drive means. Furthermore, such prior art systems require special drive transmitting equipment of a complex and costly nature.

*Summary of the invention*

The fluid power drive system of the present invention defines a closed fluid circuit including a drive means, a

2 driven means and conduit means connecting the drive and driven means. This fluid circuit is substantially filled with fluid, and the drive means produces fluid flow in alternating directions in the circuit so as to actuate the driven means.

The drive apparatus of the present invention may be operated at relatively high speeds since the power is transmitted by alternating fluid flow which can be rapidly reversed. The speed of the driven means may be readily controlled by adjusting the speed of the drive means, and in a typical example, the driven means may be caused to reciprocate at a speed in excess of 900 r.p.m. when employed with the cutter bar of an agricultural implement. The apparatus can also be operated at considerably higher speeds, and the driven means may for example be operated at approximately 2200 r.p.m. when used for drilling rocks and the like.

The wear on the system of the present invention is reduced to a minimum since the fluid transmitting medium is alternating motion of the fluid in the system, and this fluid need only move a relatively short distance in either direction during operation of the apparatus. The driven means may be spaced a considerable distance from the drive means in the present invention without adversely affecting the efficiency of operation since the power is transmitted through the fluid within the conduits of the closed circuit. These conduits may be quite lengthy, and the apparatus will operate in the intended manner.

A further advantage of the present invention is the fact that no special or unusual equipment is required, and a conventional gear pump may be readily modified to effectively operate as the drive means of the apparatus.

An object of the present invention is to provide a new and novel fluid power drive apparatus which eliminates the necessity of providing mechanical drive connections or valving in the power transmitting portions of the apparatus between the drive means and the driven means by the expedient of transmitting power through a closed fluid circuit employing alternating fluid flow therewithin.

Another object of the invention is the provision of fluid power drive apparatus the speed of which can be readily varied up to and including very high speeds and wherein the power may be transmitted over relatively great distances with good efficiency.

*Brief description of the drawing*

The drawing is a sectional view illustrating in a schematic manner the fluid-powered drive system of the present invention.

Referring now to the drawing, a pair of relatively conventional gear pumps 150 and 150' are provided. Gear pump 150 includes a gear housing 154 having a pair of conventional side ports 156 and 158 formed therein. A drive gear 160 is provided which meshes with a driven gear 162 in the usual manner. Suitable drive means is connected with the drive gear 160 for rotating the gears in the direction of the arrows indicated in the drawing.

Each of the gears is illustrated as being provided with twelve teeth thereon, one half of the teeth of each gear being relieved. The six left-hand teeth of gear 160 are provided with notches 164 therein, and the six left-hand teeth of gear 162 are provided with notches 166 therein.

These notches may be similar to those previously described.

It is important to note that the relieved teeth on gears 160 and 162 are disposed so that they mesh directly with one another while the full or unrelieved teeth of the gears also mesh directly with one another.

Gear pump 150' is substantially identical with gear pump 150, and similar portions thereof have been given the same reference numerals primed. The only difference between the two pumps is the orientation of the relieved portions of the teeth of gear pump 150' as compared to gear pump 150. It will be noted that the gears 160' and 162' are displaced 180 degrees with respect to the gears of pump 150 so that the notches 164' and 166' of the gears 160 and 162 respectively are oppositely disposed as compared to those in gear pump 150. It is apparent that during operation of the apparatus, the relieved portions of the two pumps will be 180 degrees out of phase with one another to enable proper operation of the system as hereinafter described.

The driven means is indicated generally by reference numeral 170 and comprises a fluid cylinder 172 having a pair of spaced threaded plugs 174 and 176 supported therein, these plugs being employed for filling the system with fluid and bleeding the system as necessary.

A piston 180 is slidably disposed within cylinder 172, the piston being connected with oppositely extending piston rods 182 and 184 which extend outwardly of the cylinder and are provided with bifurcated end portions 186 and 188 respectively which are pivotally interconnected with members 190 and 192 respectively through the intermediary of pivot pins 194 and 196 respectively. It should be understood that members 190 and 192 may be operatively connected with any suitable means which it is desired to drive, and in particular to any driven means which it is desired to reciprocate.

An elongated conduit 200 has one end thereof connected in side port 158 of the pump housing 154, the opposite end of conduit 200 being operatively connected with one end of cylinder 170. Another elongated conduit 202 has one end thereof connected in side port 158' of pump housing 154' the opposite end of conduit 202 being operatively connected with the opposite end of cylinder 170.

An elongated conduit 204 has one end thereof connected in side port 156 of pump housing 154, the opposite end of conduit 204 opening into a lower portion of a reservoir 206 in the form of a tank or the like adapted to contain a body of liquid 208 of the same substance as the liquid disposed throughout the system.

A further elongated conduit 210 has one end thereof connected in side port 156' of pump housing 154', the opposite end of conduit 210 opening into the lower part of reservoir means 206.

It is apparent that the pumps 150 and 150' are connected in series with the driven means 170, and are further interconnected in series with one another through the intermediary of the reservoir means 206. It should be recognized that the system will operate without the provision of the reservoir means, but the reservoir means is considered preferable since it compensates for any possible leakage in the system, and furthermore the reservoir means may serve as a cooling means for the system. If desired, the reservoir means may be provided with suitable means such as cooling fins to assist in cooling of the liquid therewithin.

In the position illustrated, the piston 180 is at the left-hand limit of movement. Further rotation of gears 160 and 162 in the direction of the arrows indicated on the drawing will cause fluid pressure to be developed in conduit 200 tending to force piston 180 to the right. At the same time, the relieved teeth of gears 160' and 162' of pump 150' will be in communication with conduit 202 and cannot form a seal with the surrounding housing, and accordingly fluid is forced from the right-hand end of cylinder 172 through conduit 202 and into gear housing 154', thereby causing piston 180 to move to the right.

After the gears of the two pumps have rotated through an angle of 180 degrees, the unrelieved teeth of gears 160' and 162' of pump 150' will develop fluid pressure in conduit 202, and the relieved portions of the teeth of gears 160 and 162 of pump 150 will be in communication with conduit 200 so that the piston will then be forced to the left under the influence of pressure entering the cylinder through conduit 202, the fluid flowing out of the left-hand end of the cylinder through conduit 200 and into gear housing 154.

Side ports 156 and 156' of pumps 150 and 150' are continuously in intercommunication with one another through conduits 204 and 210 and the reservoir means 206 so that liquid can freely flow therebetween through the reservoir means.

It is apparent from the foregoing that there is provided according to the present invention new and novel fluid power drive apparatus which eliminates the necessity of employing mechanical drive connections or fluid systems having valving therein for transmitting power from a continuously rotating power source to a continuously reciprocated driven means. The power is transmitted through a closed fluid circuit employing alternating fluid flow therewithin for actuating the driven means. The speed of reciprocation of the driven means may be readily varied up to and including very high speeds simply by altering the speed of rotation of the drive means. The power may be transmitted over relatively great distances simply by increasing the length of the associated conduits without seriously affecting the efficiency of the system.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A fluid power drive system comprising means defining a fluid circuit and including drive means, driven means and conduit means connecting said drive means and said driven means, said fluid circuit being substantially filled with fluid, said drive means producing fluid flow in alternating directions in said circuit to actuate said driven means, said drive means comprising at least two rotating means, said driven means comprising a reciprocating means, said rotating means being connected in said circuit so that each of the drive means is in series with said reciprocating means and with one another.

2. Apparatus as defined in claim 1 wherein said reciprocating means includes a cylinder having a continuously reciprocable piston slidably mounted therewithin, said rotating means each comprising a continuously rotatable fluid pump, said conduit means including a first conduit portion connected between one side of one of said pumps and one side of said piston, a second conduit portion connected between one side of the other of said pumps and the other side of said piston, the opposite side of each of said pumps being interconnected with one another through further conduit portions.

3. Apparatus as defined in claim 2 wherein said other conduit portions are interconnected through the intermediary of a reservoir means.

4. Apparatus as defined in claim 1 wherein each of said rotating means comprises a pump including a housing portion having a pair of gears rotatably supported therewithin, each of said gears having a plurality of teeth formed thereon, the teeth of the two gears being adapted to mesh with one another to form a seal therebetween and also being adapted to form a seal with respect to the associated housing portion for producting fluid pressure, a portion of the teeth of each of said gears being relieved.

5. Apparatus as defined in claim 4 wherein approximately one-half of the teeth of each of said gears are relieved.

6. Apparatus as defined in claim 5 wherein the relieved teeth of said gears are disposed so that they mesh directly with one another.

References Cited

UNITED STATES PATENTS

| | | | |
|---|---|---|---|
| 2,669,840 | 2/1954 | Joy | 91—417 XR |
| 2,697,911 | 12/1954 | Joy | 60—52 |
| 2,929,212 | 3/1960 | Lewis et al. | 60—52 |
| 2,978,044 | 4/1961 | Baines | 60—54.5 XR |
| 2,984,985 | 5/1961 | MacMillin. | |
| 3,287,909 | 11/1966 | Kell | 60—54.5 |

EDGAR W. GEOGHEGAN, *Primary Examiner.*

U.S. Cl. X.R.

60—54.5; 91—81; 103—126